(12) United States Patent
Marcelli et al.

(10) Patent No.: US 10,356,539 B2
(45) Date of Patent: Jul. 16, 2019

(54) METHOD FOR PERFORMING AN ACTIVE PROFILING OF A SOUND EMITTED BY AN ENGINE AND CORRESPONDING PROFILING SYSTEM (71) Applicant: Magneti Marelli S.p.A., Corbetta (Milan) (IT)

(72) Inventors: Antonio Marcelli, Corbetta (IT); Saverio Armeni, Corbetta (IT); Walter Nesci, Corbetta (IT)

(73) Assignee: Magneti Marelli S.p.A., Corbetta (IT)

( * ) Notice: Subject to any disclaimer, the term of this patent is extended or adjusted under 35 U.S.C. 154(b) by 161 days.

(21) Appl. No.: 14/977,126

(22) Filed: Dec. 21, 2015

(65) Prior Publication Data

US 2016/0192095 A1    Jun. 30, 2016

(30) Foreign Application Priority Data

Dec. 24, 2014 (IT) .................................. 2014A1104

(51) Int. Cl.
*G10K 15/02* (2006.01)
*H04R 29/00* (2006.01)
(Continued)

(52) U.S. Cl.
CPC ............. *H04R 29/00* (2013.01); *F01N 1/065* (2013.01); *F01N 9/00* (2013.01); *F01N 9/005* (2013.01);
(Continued)

(58) Field of Classification Search
CPC ............. H04R 2499/13; G10K 11/178; G10K 11/175; G10K 11/1782; G10K 11/1784;
(Continued)

(56) References Cited

U.S. PATENT DOCUMENTS 5,571,239 A * 11/1996 Kameda ................... F01N 1/065
123/184.21
5,635,903 A * 6/1997 Koike ...................... A63H 17/34
340/384.1
(Continued)

FOREIGN PATENT DOCUMENTS

DE     102006059351 A1   6/2008
EP         0481450 A1    4/1992
(Continued)

OTHER PUBLICATIONS

Italian Search Report dated Aug. 26, 2015 for Italian Patent Application No. TO2014A001104.
(Continued)

*Primary Examiner* — Andrew C Flanders
(74) *Attorney, Agent, or Firm* — Howard & Howard Attorneys PLLC (57) ABSTRACT

A method for performing an active profiling of the sound emitted by a vehicle engine including the steps of injecting second acoustic waves (MW), which are able to combine with the first acoustic waves (EW) in a merge point in said primary propagation path and to generate third resulting acoustic waves (RW); and generating a driving signal for the diffuser by regulating the amplitude of harmonics of the driving signal (SP) as a function of reference acoustic waves and of a workpoint of the engine, calculating equalization coefficients ($\alpha_1, \ldots, \alpha_M$) to be applied to the amplitudes of said harmonics of the driving signal (SP) via a self-tuning procedure, and comparing the reference acoustic waves (TW) with a simulation (SRW) of the resulting waves. The simulation (SRW) is obtained by applying to a simulation of the second acoustic waves a model of the secondary propagation path.

9 Claims, 5 Drawing Sheets (51) Int. Cl.
*F01N 9/00* (2006.01)
*F01N 1/06* (2006.01)

(52) U.S. Cl.
CPC ...... *G10K 15/02* (2013.01); *F01N 2900/0412* (2013.01); *G10K 2210/12822* (2013.01); *G10K 2210/3025* (2013.01); *G10K 2210/3032* (2013.01); *G10K 2210/51* (2013.01); *H04R 2499/13* (2013.01); *Y02T 10/47* (2013.01)

(58) Field of Classification Search
CPC ........... G10K 11/1786; G10K 11/1788; G10K 2210/00; G10K 2210/12; G10K 2210/121; G10K 2210/3035; G10K 2210/30351; G10K 2210/128; G10K 2210/1282; G10K 2210/12821; G10K 2210/12822
See application file for complete search history.

(56) References Cited

U.S. PATENT DOCUMENTS

| | | | | |
|---|---|---|---|---|
| 5,692,052 | A * | 11/1997 | Tanaka | F01N 1/065 381/71.9 |
| 6,332,029 | B1 * | 12/2001 | Azima | B42D 15/022 181/166 |
| 7,979,147 | B1 * | 7/2011 | Dunn | G10K 15/02 181/192 |
| 2002/0164038 | A1 * | 11/2002 | Fuesser | G10K 11/178 381/71.4 |
| 2005/0175186 | A1 * | 8/2005 | Yasushi | B60Q 5/008 381/61 |
| 2008/0152159 | A1 * | 6/2008 | Kassner | F01N 1/065 381/71.5 |
| 2008/0173496 | A1 * | 7/2008 | Kassner | F01N 1/065 181/204 |
| 2008/0292110 | A1 * | 11/2008 | Kobayashi | G10K 11/178 381/71.4 |
| 2009/0260916 | A1 * | 10/2009 | Kassner | F01N 1/065 181/206 |
| 2010/0166210 | A1 * | 7/2010 | Isozaki | B60L 3/00 381/86 |
| 2012/0288111 | A1 * | 11/2012 | Luecking | G10K 11/1782 381/71.5 |
| 2012/0323442 | A1 * | 12/2012 | Tanaka | B60Q 5/008 701/36 |
| 2015/0364125 | A1 * | 12/2015 | Park | G10K 15/02 701/36 |

FOREIGN PATENT DOCUMENTS

| | | |
|---|---|---|
| EP | 0526111 A2 | 2/1993 |
| EP | 1947642 A1 | 7/2008 |
| EP | 2600342 A2 | 6/2013 |
| WO | 9509415 A1 | 4/1995 |
| WO | 2013114807 A1 | 8/2013 |

OTHER PUBLICATIONS

"Adjusting the Tonal Quality of Engine Noise Using Active Noise Control Techniques," Research Disclosure, No. 320, pp. 972-973 (Dec. 1990).

* cited by examiner

METHOD FOR PERFORMING AN ACTIVE PROFILING OF A SOUND EMITTED BY AN ENGINE AND CORRESPONDING PROFILING SYSTEM

CROSS-REFERENCE TO RELATED APPLICATIONS

The present application claims priority to and all the benefits of Italian Patent Application No. TO 2014 A 001104, filed on Dec. 24, 2014, which is hereby expressly incorporated herein by reference in its entirety.

BACKGROUND OF THE INVENTION

1. Field of the Invention

The present invention relates to techniques for performing an active profiling of the sound emitted by a vehicle engine that issues first acoustic waves along a primary path of propagation of acoustic waves, in particular an exhaust duct. More specifically, the present invention is directed toward such a method including injecting, via an acoustic-wave diffuser, into a secondary propagation path that merges in said primary path, second acoustic waves that are able to combine with said first acoustic waves in a merge point in said primary propagation path and to generate third resulting acoustic waves; and generating a signal for driving the aforesaid diffuser by regulating the amplitude of harmonics of the driving signal as a function of reference acoustic waves and of a workpoint of the engine.

The above techniques are described herein with specific reference to internal-combustion engines; however, they may refer to other types of engines, for example electric engines.

2. Description of the Related Art

It is known in the automotive sector to use systems for so-called active sound profiling, which aim at reproducing a given sound profile. Active-sound-profiling techniques can be adopted, for example, for improving the quality of sound inside the passenger compartment of motor vehicles for transport of passengers by modifying the noise of the engine within the passenger compartment. This modification may envisage that the noise of the engine is modified so as to be similar to that of the engine of another model of motor vehicle, for example a prestige-level automobile.

An active-sound-profiling system normally envisages use of an electronic control unit, which, on the basis of internal information that it receives at input regarding the workpoint of the internal-combustion engine, actuates a diffuser in the exhaust system, in particular downstream of the gas after-treatment system. This system has the purpose of injecting, in addition to the sound actually emitted by the engine itself, a precise set of acoustic waves (harmonics) with frequencies corresponding to the current engine workpoint (pedal/r.p.m. and load/fuel). The amplitudes of the injected waves are tuned to follow the amplitudes associated to another motor vehicle that is defined as "target vehicle" at each engine workpoint. In this way, the original sound of the motor vehicle is coloured and becomes similar to the sound of the target vehicle. The waves to inject, i.e., the frequencies to inject, and their amplitudes are selected on the basis of the waves that identify the target sound (i.e., in the target-sound spectrum) of the target vehicle so as to imitate its tone.

Figure 1:
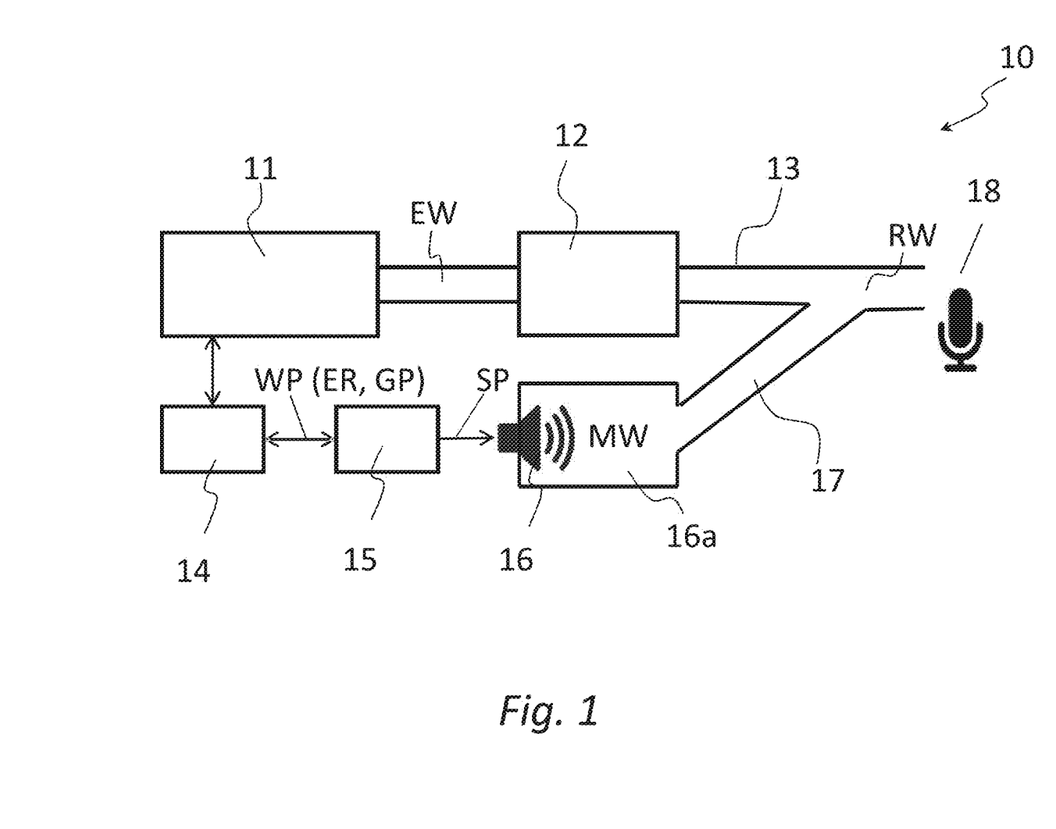
FIG. 1 is a schematic view of a system according to the prior art.

FIG. 1 illustrates a principle diagram of an active-sound-profiling system, designated by the reference number 10. In general, an engine 11 comprises a primary exhaust path 13, along which the sound of the engine 11, i.e., the acoustic waves EW, propagates. Inserted along the primary path 13 is a system 12 for after-treatment of exhaust gases. Appearing at the outlet of the primary path 13 is a microphone 18 for measuring the sound. The active-sound-profiling system 10 moreover comprises a secondary exhaust path 17, giving out into which is a diffuser or speaker 16, the secondary path converging in the primary path 13 in a merge point downstream of the exhaust-gas after-treatment system 12 and upstream of the outlet of the primary path 13 and of the microphone 18. The active-sound-profiling system 10 moreover comprises an ESPU (Electronic Sound-Profiling Unit) 15. The ESPU 15 receives from an ECU (Engine Control Unit) 14 information regarding a workpoint WP of an engine 11, in particular, for example, an internal-combustion engine. This information regarding a workpoint WP includes, for example, a number of values of engine r.p.m. ER and/or the signal indicating the gas-pedal percentage GP, i.e., the position of the accelerator pedal expressed as a percentage. The electronic sound-profiling unit 15 drives a speaker 16 via a driving signal SP in order to generate second acoustic waves MW injected into the secondary exhaust path 17, which add to the engine acoustic waves EW in the primary path 13, downstream of the after-treatment system 12, in the merge point with the secondary path 17, so that at output from the primary path 13 third resulting acoustic waves RW are formed, which identify an engine sound different from the sound identified by the first waves EW, which correspond to the original sound of the engine 11 and can be measured, for example, using the microphone 18. Clearly, the microphone 18 does not form part of the system in normal running conditions of the vehicle, and has the calibration purposes what will be illustrated in what follows.

A problem of known systems is to tune with sufficient accuracy the amplitudes of the injected acoustic waves to obtain the desired resulting acoustic waves.

SUMMARY OF THE INVENTION

The object of the present invention is to provide an improved method that will make it possible to tune with greater accuracy as compared to known solutions the amplitudes of the injected acoustic waves to obtain the desired resulting acoustic waves.

According to the present invention, the above object is achieved thanks to an active-sound-profiling method, as well as to a corresponding system having the characteristics specified in the ensuing claims.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

In brief, the solution according to the invention regards an active-sound-profiling method and a corresponding system that automatically tunes the amplitudes of the waves injected into the secondary path, using modules configured with a simulation environment and a mathematical model, which describes the physical path from the speaker to the exhaust, measuring the sound with a microphone.

In various embodiments, the solution can be applied not only to vehicles with internal-combustion engines, but also to electric vehicles, applying the method to the specific physical path from the speaker to the microphone, or else to other physical paths.

In various embodiments, the solution described comprises an automatic procedure that tunes the amplitudes of the injected waves, choosing values from a set of software parameters that represent equalization coefficients, which are a function of the workpoint WP and are stored in the sound-profiling unit.

In particular, it is envisaged to map the values of amplitude of the injected waves in a LUT (Look-Up Table), which receives at input a workpoint expressed, for example, via the engine r.p.m. and the position of the gas pedal. It is envisaged to provide a look-up table for each frequency injected.

The required amplitudes can be tuned off-line via a self-tuning procedure.

Figure 2:
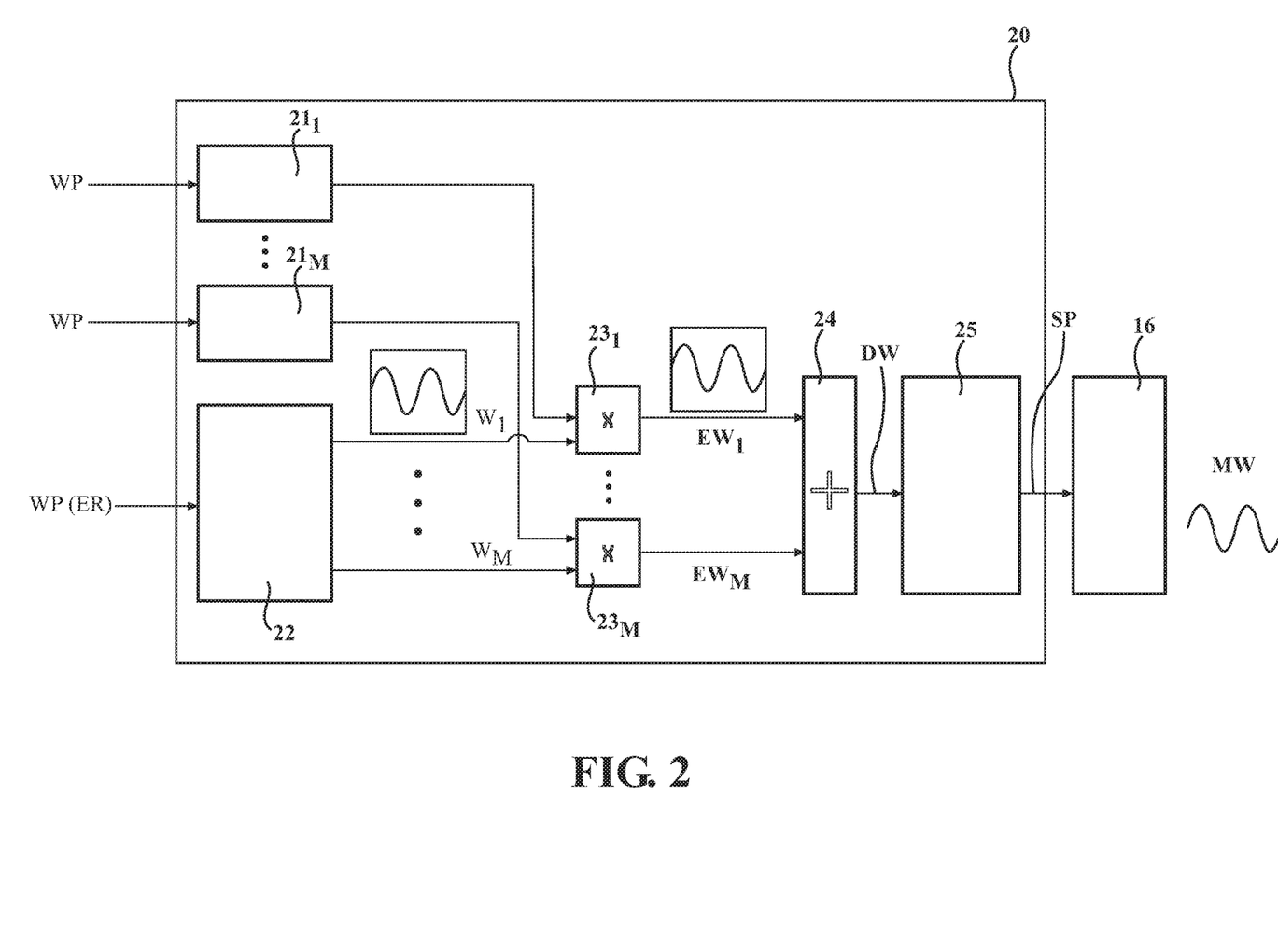
FIG. 2 is a detailed diagram of a module of a system implementing the method according to the invention.

The method can in general be implemented in a system similar to the system 10 of FIG. 1, where instead of the sound-profiling unit 15 a sound-profiling unit 20 is used configured as illustrated schematically in FIG. 2.

The above profiling unit 20 receives at input from the ECU 14 the workpoint WP of the engine 11 represented by a pair of values of engine r.p.m. ER and position of gas pedal GP, the latter quantity substantially representing the engine torque. As shown in FIG. 2, the profiling unit 20 preferably has as input only the information regarding a workpoint WP of the engine 11.

Given a number M of harmonics that have been selected to be used for generating the driving signal SP, the profiling unit 20 comprises a harmonic-generation module 22, which generates, as a function of the engine r.p.m. ER, or rather of a frequency of rotation f (1 Hz=60 r.p.m.) corresponding to the value of the engine r.p.m. ER, measured by the unit 14 in the time domain, M basic harmonics W1, . . . , WM of respective order ranging from 1 through M. The first harmonic W1 is a sinusoid with frequency f1=f, i.e., equal to the frequency corresponding that of the engine workpoint, and the M-th harmonic has a frequency fM=M·f. The basic harmonics W1, . . . , WM will in general have an amplitude equal to unity.

The profiling unit 20 thus comprises M respective look-up tables 21, respectively 211, . . . , 21M. Each i-th look-up table 21$i$, for a specific corresponding harmonic Wi, associates to a value of workpoint WP a respective equalization coefficient $\alpha$i. Consequently, the look-up tables 21 generate M equalization coefficients $\alpha$1, . . . , $\alpha$M. A block of M multipliers 23 then multiplies each equalization coefficient $\alpha$1, . . . , $\alpha$M by the amplitude of the harmonic W1, . . . , WM of corresponding order, generating equalized harmonics EW1, . . . , EWM, where EWi=$\alpha$i·Wi.

Then, in an adder 24, all the equalized harmonics EWi are added together to obtain a digital driving wave DW, such that:

$$DW = \alpha_1 \cdot W_1 +, \ldots, + \alpha_M \cdot W_M$$

The digital driving wave DW is supplied to a digital-to-analog converter 25, which determines the driving signal SP, which is an analog signal, in particular an analog voltage. This driving signal 15 is supplied to the diffuser, or speaker 16, which injects the second acoustic waves MW into the secondary path 17.

Figure 3:
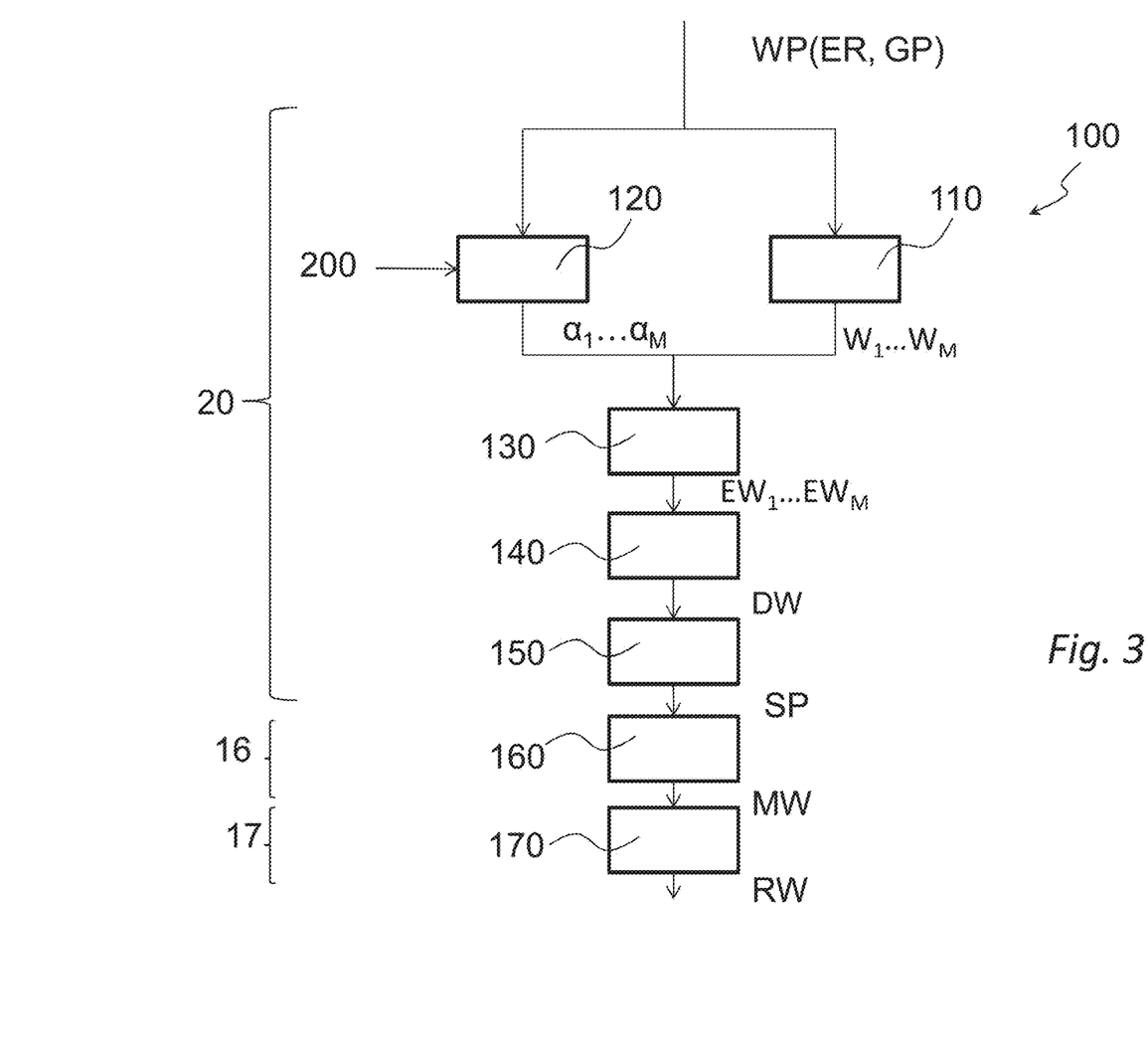
FIG. 3 is a flowchart of the profiling method according to the invention.

FIG. 3 shows a flowchart illustrating the operations of the method described herein, designated as a whole by the reference 100.

Designated by 110 is the step of generation of basic harmonics W1, . . . , WM, as a function of the frequency f associated to the current workpoint WP of the engine 11.

Designated by 120 is an operation of generation of the equalization coefficients $\alpha$1, . . . , $\alpha$M as a function of the values of workpoint WP, using, as discussed with reference to FIG. 2, M look-up tables 21, respectively 211, . . . , 21M, which, for a corresponding specific harmonic Wi, associate to a value of workpoint WP a respective equalization coefficient $\alpha$i. The values of equalization coefficients $\alpha$i as a function of the workpoint WP in the look-up tables 21 are obtained via a procedure 200 of calculation of the equalization coefficients that will be described with reference to FIG. 4.

Next, in a step 130, each equalization coefficient $\alpha$1, . . . , $\alpha$M generated by a respective LUT 211, . . . , 21M, for a given workpoint WP, is multiplied by the amplitude of the harmonic W1, . . . , WM of corresponding order, to generate equalized harmonics EW1, . . . , EWM, where EWi=$\alpha$i·Wi.

Then, in a step 140 all the equalized harmonics EWi are added together to obtain a digital driving wave DW.

In a step 150, the digital driving wave DW is converted into an analog signal, the driving signal SP.

In a step 160, the driving signal SP is supplied to the diffuser 16, which generates the second acoustic waves MW.

In a step 170, the second acoustic waves MW pass through the secondary path 17 and flow into in the primary path 13, combining with the first waves EW, to yield the third resulting waves RW, which are perceived by the users under normal conditions of use of the vehicle or can be measured by the microphone 18.

As may be seen from the diagram of FIG. 3, the equalization coefficients $\alpha$1, . . . , $\alpha$M stored in the LUTs 21 that reside in the profiling unit 20 are determined via a self-tuning procedure 200 (illustrated in FIG. 4), which substantially envisages determination of the aforesaid equalization coefficients $\alpha$1, . . . , $\alpha_M$ as a function of reference acoustic waves TW and of a model H of the secondary path 16.

Figure 4:
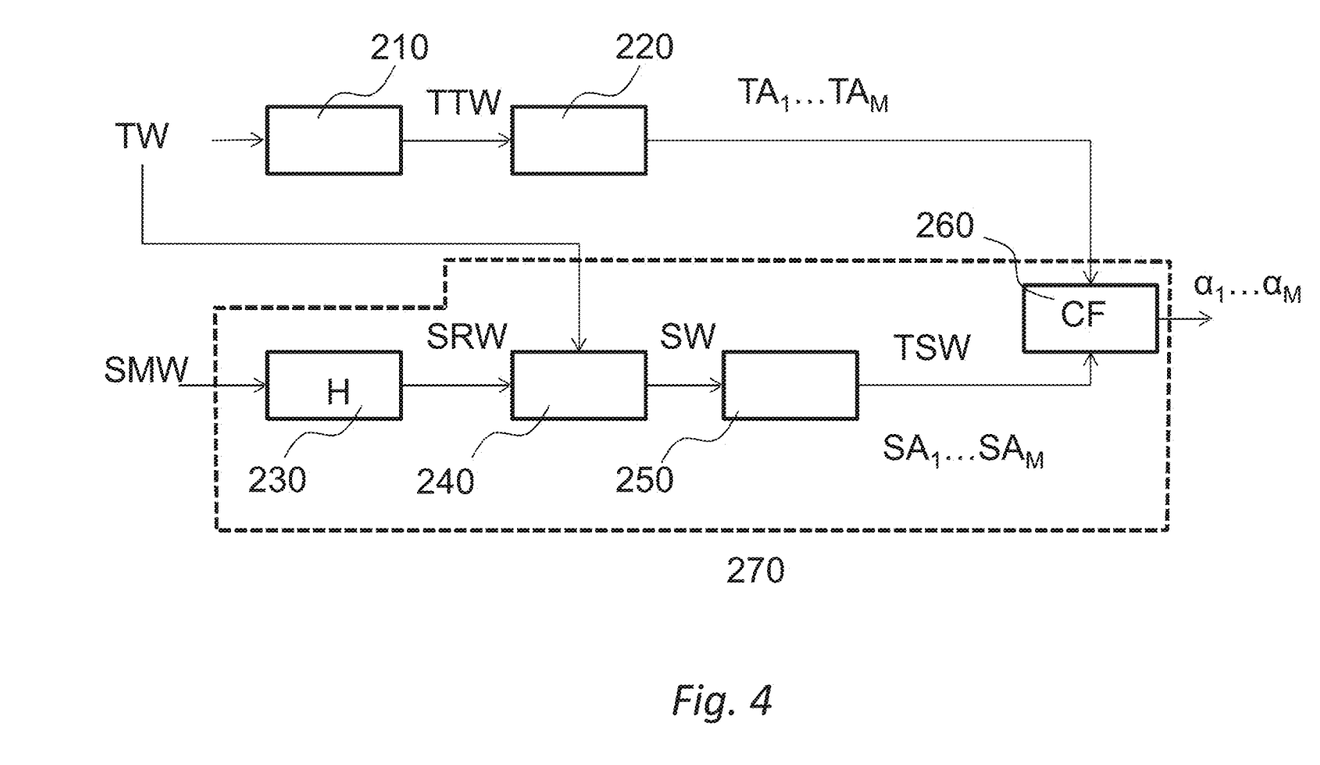
FIG. 4 is a flowchart of a self-tuning procedure used in association with the method of FIG. 3.

The reference acoustic waves TW are the reference acoustic waves that it is desired to reproduce at output from the primary path 13, i.e., the waves that the third resulting waves RW are required to reproduce; thus, in particular, they are the waves that represent the sound of another engine of another vehicle.

The model H of the secondary path 17 describes, instead, how the sound emitted by the diffuser 16 is modified and then detected by the microphone 18 at the end of the primary exhaust path 13. The model H represents, that is, a transfer function from an input, represented by the driving signal SP to an output, represented by the resulting waves RW. In general, then, the model H also includes the diffuser 16. The diffuser 16 is usually included in an acoustic chamber; in this case, the model also includes this chamber. As has been said, the microphone 18 is not comprised in the active-profiling system implemented on a vehicle, but is used only for calibrating the amplitudes of the acoustic waves of the system and for modelling the secondary path 17. Consequently, the active-sound-profiling system described herein carries out open-loop regulation of the equalization coefficients. In fact, during operation, there is no feedback signal from the output, in particular from the microphone 18. This open loop for regulation of the equalization coefficients receives at input the information regarding a workpoint WP and supplies at output the third resulting acoustic waves RW, which identify an engine sound different from the sound identified by the first waves EW corresponding to the original sound of the engine 11.

Assuming that amplitudes of the acoustic waves are to be calibrated as a function of a specific pair of values of r.p.m. ER of the engine 11 and of position of the gas pedal GP, which represents a specific workpoint WP of the engine 11, the self-tuning procedure 200 is implemented in a simulation environment, i.e., for example on a processor in an in-factory setting step, in any case prior to the method 100, via the following steps:

applying 210 an FFT (Fast Fourier Transform) to the reference acoustic waves TW of a reference vehicle, in particular to a recording of said waves TW made previously, to obtain a reference spectrum TTW; and extrapolating 220, or extracting, from said reference spectrum TTW M amplitudes TA1, . . . , TAM of reference harmonics that the method and system described herein must imitate in the third resulting waves RW.

The steps 210 and 220 are carried out for a plurality of workpoints WP so that, for each workpoint WP, there is a respective set of amplitudes TA1, . . . , TAM of reference harmonics.

Moreover, for each workpoint WP an optimization procedure 270 is carried out that envisages injection 230 of a simulation SMW of the second acoustic waves MW into the model H to obtain corresponding simulated resulting waves SRW. This step 230 is carried out a number of times with different values of equalization coefficients that model the amplitudes of the second injected waves SMW. Since it is an iterative procedure, in a first step initial values of second simulated acoustic waves SMW will be injected, with initial values of coefficients of the second simulated acoustic waves SMW, whereas in the subsequent iterations the current values produced by the optimization procedure 270 in the previous iteration are used.

At each execution of step 230, there follows an operation 240 of addition of the simulated resulting waves SRW to the reference waves TW to obtain a sum wave SW, which in a step 250 is transformed via FFT into a transformed sum wave TSW, of which M amplitudes SA1, . . . , SAM are extrapolated according to the number M of harmonics and the running frequency f of the engine 11.

Then, in a step 260, there is carried out evaluation and minimizazion of a cost function as a function of the M amplitudes TA1, . . . , TAM of reference harmonics and of the transformed sum wave TSW, in particular as a function of their difference, for example the sum of the errors between the amplitudes TA1, . . . , TAM of reference harmonics and amplitudes SA1, . . . , SAM of the transformed sum wave TSW.

The values of equalization coefficients $\alpha 1, \ldots, \alpha M$ produced at output, for a given value of workpoint WP, by the optimization procedure 270, are the ones that minimize the cost function.

Also the steps 230-260 are carried out for a plurality of workpoints WP, so that for each workpoint WP there is a respective set of amplitudes SA1, . . . , SAM of simulated harmonics.

In other words, the operations of the procedure 200 are carried out a number of times for a plurality of workpoints WP, defined by pairs of values of engine r.p.m. and gas-pedal position, to yield at output sets of equalization coefficients $\alpha 1, \ldots, \alpha M$ for each of the aforesaid workpoints WP. During execution of the procedure 200 for a given workpoint WP, the steps 230-260 are moreover carried out iteratively, varying the amplitude (coefficients) of the second simulated acoustic waves SMW.

The optimal equalization coefficients $\alpha 1, \ldots, \alpha M$ obtained in the simulation environment can be refined in a real environment equipped with a sound-profiling system by intervening on the parameters $\alpha 1, \ldots, \alpha M$ via manual tuning, according, for example, to the impression obtained by a skilled operator from listening to the engine.

Figure 5:
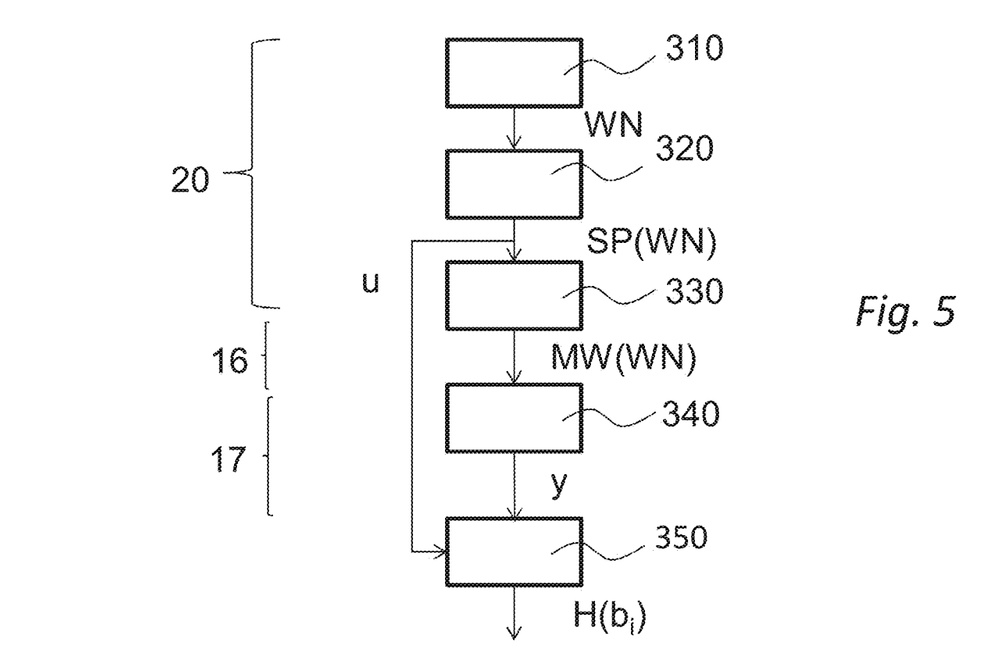
FIG. 5 is a flowchart of a procedure for obtaining a model of a path of acoustic waves, which is used by the method of FIG. 3.

The model H of the secondary path can be obtained using a FIR (Finite Impulse Response) filter. In order to calibrate the parameters of the FIR filter that implements the model H, white noise WN is injected, via the diffuser 16, into the secondary path 17, keeping the engine 11 turned off and recording, with the microphone 18, both the driving signal SP (input signal u to the model H) associated to the white noise SW and the resulting waves RW at output from the primary path 13 (output signal y from the model H). If a number of measurements are made, by sending different input signals u a number of times and measuring the corresponding output signals y, it is then possible to calculate values of the parameters, in particular the coefficients $b_i$, of the FIR filter of the model H of the secondary path, applying in a processor a procedure of regression, in particular the LMS (Least Mean Square) regression, following procedures of calibration of adaptive filters that employ the LMS procedure that are in themselves known.

The purpose of the model H of the secondary path is to be able to estimate how the sound emitted by the diffuser 16, which is located in an acoustic chamber 16a included in the secondary path 17, is modified by the path comprising the secondary path 17 and the stretch of primary path 13 from the merge point of confluence to the exhaust outlet, where the sound is measured by the microphone 18.

The procedure of identification of the model H, designated by 300 in FIG. 5, includes performing, with the engine 11 off, the following steps:

in a step 310, a digital white-noise signal WN is generated, by the profiling unit 20, for example via a random-number generator module;

this white-noise signal generated in step 310 is sent at input to the converter 25, which produces a driving signal SP associated to white noise, i.e., a signal SP(WN); in this step, it is also possible to filter the white noise WN via a band-pass filter for cutting off the low frequencies that determine non-linearities of the system (distortion in frequency of the sound) and the high frequencies that are not used by the profiling system;

in step 330, the driving signal associated to the white noise SP(WN) generates, via the diffuser 16, injected waves MW(WN) as a function of the white noise;

in step 340, after propagation of the acoustic waves along the secondary path 17 and confluence thereof in the primary path 13, a measurement is made of the resulting waves RW, corresponding to the output of the model y, which are voltage or pressure values measured by the microphone 18; it may be noted, in particular, that it is envisaged to acquire in a synchronous way the output of the converter module 25, i.e., the voltage that represents the input u, and the voltage (or pressure) of the microphone 18, i.e., the output signal y: it may be noted that it is preferable to start acquisition with a brief period of silence (3-4 s) and then to inject white noise WN and the corresponding driving signal SP(WN); this enables estimation of the travel delay from the converter 25 to the microphone 18;

in step 350, off-line, in a processor, an LSM procedure is carried out, on the basis of an input signal u corresponding to the driving signal SP(WN) and on the basis of an output signal y corresponding to the resulting waves RW; the secondary path 17 is modelled according to the equation of the FIR filter y[n] corresponding to the model H in the time domain:

$$y[n] = \sum_{i=0}^{N} b_i u[n-i]$$

The steps 310-350 are repeated a number of times with different levels of amplitude of white noise WN generated in step 310 in order to obtain a first evaluation and then robustness of identification.

Hence, from what has been described above, the advantages of the solution proposed emerge clearly.

The active-sound-profiling method described enables tuning with greater accuracy, as compared to known solutions, of the amplitudes of the injected acoustic waves to obtain the desired resulting acoustic waves. The profiling method is able to equalize engine sounds characterized both in amplitude and engine orders, or acoustic frequencies, possibly adding new frequencies to the original sound of the engine.

In various embodiments, the solution can be applied not only to vehicles with internal-combustion engines, but also to electrically propelled vehicles, applying the method to the specific physical path from the speaker to the microphone, or to other physical paths.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method for performing an active profiling of the sound emitted by a vehicle engine that issues first acoustic waves (EW) along a primary path of propagation of acoustic waves, said method comprising the steps of:
injecting second acoustic waves (MW) via an acoustic-wave speaker, into a secondary propagation path that merges in said primary path, wherein said second acoustic waves (MW) combine with said first acoustic waves (EW) in a merge point in said primary propagation path and to generate third resulting acoustic waves (RW);
generating a driving signal (SP) for driving said speaker by regulating the amplitude of harmonics of said driving signal (SP) as a function of reference acoustic waves (TW) of a reference vehicle and of a workpoint (WP) of the engine;
calculating respective equalization coefficients ($\alpha_1, \ldots, \alpha_M$) to be applied to the corresponding amplitudes of said harmonics of said driving signal (SP) via a self-tuning procedure, which comprises comparing said reference acoustic waves (TW) of a reference vehicle with a simulation (SRW) of said resulting waves (RW), said simulation (SRW) being obtained by applying a model (H) of the secondary propagation path to a simulation (MSW) of the second injected acoustic waves (MW);
generating basic harmonics ($W_1, \ldots, W_M$) as a function of the current workpoint (WP) of the engine;
obtaining said equalization coefficients ($\alpha_1, \ldots, \alpha_M$) as a function of the values of workpoint (WP);
obtaining equalized harmonics ($EW_1, \ldots, EW_M$) as a function of said equalization coefficients ($\alpha_1, \ldots, \alpha_M$);
adding together said equalized harmonics ($EW_1, \ldots, EW_M$) to obtain a digital driving wave (DW); and
converting said digital driving wave (DW) into an analog signal corresponding to the driving signal (SP).

2. The method as set forth in claim 1, wherein said operation of generating basic harmonics ($W_1, \ldots, W_M$) comprises generating, as a function of the engine r.p.m. (ER), a pre-set number (M) of basic harmonics ($W_1, \ldots, W_M$) of a sinusoidal signal at the frequency (f) identified by said engine r.p.m. (ER).

3. The method as set forth in claim 1, wherein said self-tuning procedure comprises:
applying an FFT (Fast Fourier Transform) to the reference acoustic waves (TW), which in particular are originated by a reference vehicle, to obtain a reference spectrum (TTW), and extrapolating from said reference spectrum (TTW) amplitudes ($TA_1, \ldots, TAM$) of reference harmonics;
injecting a simulation (MSW) of the second acoustic waves (MW) into the model (H) of the secondary path and obtaining corresponding simulated resulting waves (SRW), in particular for different values of equalization coefficients ($\alpha_1, \ldots, \alpha_M$) that model the amplitudes of the second injected waves (MW);
adding the resulting waves (RW) to the reference waves (TW) and applying a transform (FFT) to a resulting sum wave (SW), to obtain a transformed sum wave (TSW);
evaluating and minimizing a cost function (CF) as a function of the amplitudes ($TA_1, \ldots, TA_M$) of reference harmonics and of amplitudes ($SA_1, \ldots, SA_M$) of the transformed sum wave (TSW), in particular as a function of their difference calculated as sum of the errors between the amplitudes ($TA_1, \ldots, TA_M$) of reference harmonics and amplitudes ($SA_1, \ldots, SA_M$) of the transformed sum wave (TSW), supplying as values of equalization coefficients ($\alpha_1, \ldots, \alpha_M$) for a given value of workpoint (WP) the values that minimize said cost function (CF).

4. The method as set forth in claim 1, wherein said method further includes an identification procedure for identifying said model (H) of the secondary path, said procedure comprises calculating the parameters of a FIR (Finite Impulse Response) filter.

5. The method as set forth in claim 1, wherein said calculation of the parameters of a FIR filter comprises:
generation and injection, via the speaker, white noise (WN) into the secondary path, keeping the engine turned off, both acquiring the driving signal (SP) associated to the white noise (WN) as input signal (u) of the model (H) and acquiring the corresponding resulting waves (RW) at output from the primary path as output signal (y) of the model (H), repeating said operation of injection a plurality of times with different amplitudes of white noise (WN) at input, to obtain different instances of output signal (y); and calculation of values of parameters ($b_j$) of the FIR filter of the model (H) of the secondary path, applying a regression as a function of said plurality of instances of inputs (u) and outputs (y), in particular, applying an LMS (Least Mean Square) procedure.

6. The method as set forth in claim 1, wherein said workpoint (WP) comprises a value of engine r.p.m. (ER) and a value of gas-pedal percentage (GP), which are, in particular, issued by an electronic control unit of the vehicle.

7. A system for active profiling of the sound emitted by a vehicle engine that issues first acoustic waves (EW) along a primary path of propagation of acoustic waves, said system comprising a secondary path, which merges in said primary path of propagation, in which an acoustic-wave speaker injects second acoustic waves (MW), which combine with said first acoustic waves (EW) in a merge point in said primary path of propagation and to generate third resulting acoustic waves (RW), an active-sound-profiling unit that generates a driving signal (SP) for said speaker by regulating the amplitude of harmonics of said driving signal (SP) as a function of reference acoustic waves (TW) and of a workpoint (WP) of the engine, said system acting to carry out on one or more processors including:

calculating respective equalization coefficients ($\alpha_1, \ldots, \alpha_M$) to be applied to the corresponding amplitudes of said harmonics of said driving signal (SP) via a self-tuning procedure, which comprises comparing said reference acoustic waves (TW) of a reference vehicle with a simulation (SRW) of said resulting waves (RW), said simulation (SRW) being obtained by applying a model (H) of the secondary propagation path to a simulation (MSW) of the second injected acoustic waves (MW);

generating basic harmonics ($W_1, \ldots, W_M$) as a function of the current workpoint (WP) of the engine;

obtaining said equalization coefficients ($\alpha_1, \ldots, \alpha_M$) as a function of the values of workpoint (WP);

obtaining equalized harmonics ($EW_1, \ldots, EW_M$) as a function of said equalization coefficients ($\alpha_1, \ldots, \alpha_M$);

adding together said equalized harmonics ($EW_1, \ldots, EW_M$) to obtain a digital driving wave (DW); and converting said digital driving wave (DW) into an analog signal corresponding to the driving signal (SP).

8. The system as set forth in claim 7, wherein said active-profiling unit comprises a harmonic-generation module, configured for generating, as a function of the engine r.p.m. (ER), a pre-set number (M) of basic harmonics ($W_1, \ldots, W_M$) of a sinusoidal signal at a frequency (f) identified by said engine r.p.m. (ER), and a plurality of look-up tables, each look-up table, for a specific corresponding harmonic ($W_i$), associating to a value of workpoint (WP) a respective equalization coefficient ($\alpha_i$).

9. The system as set forth in claim 7, wherein said engine is an internal-combustion engine or an electric engine.

* * * * *